Nov. 12, 1935.  G. E. WADSWORTH  2,020,486
METER TEST SWITCH
Filed Aug. 1, 1931   2 Sheets-Sheet 1
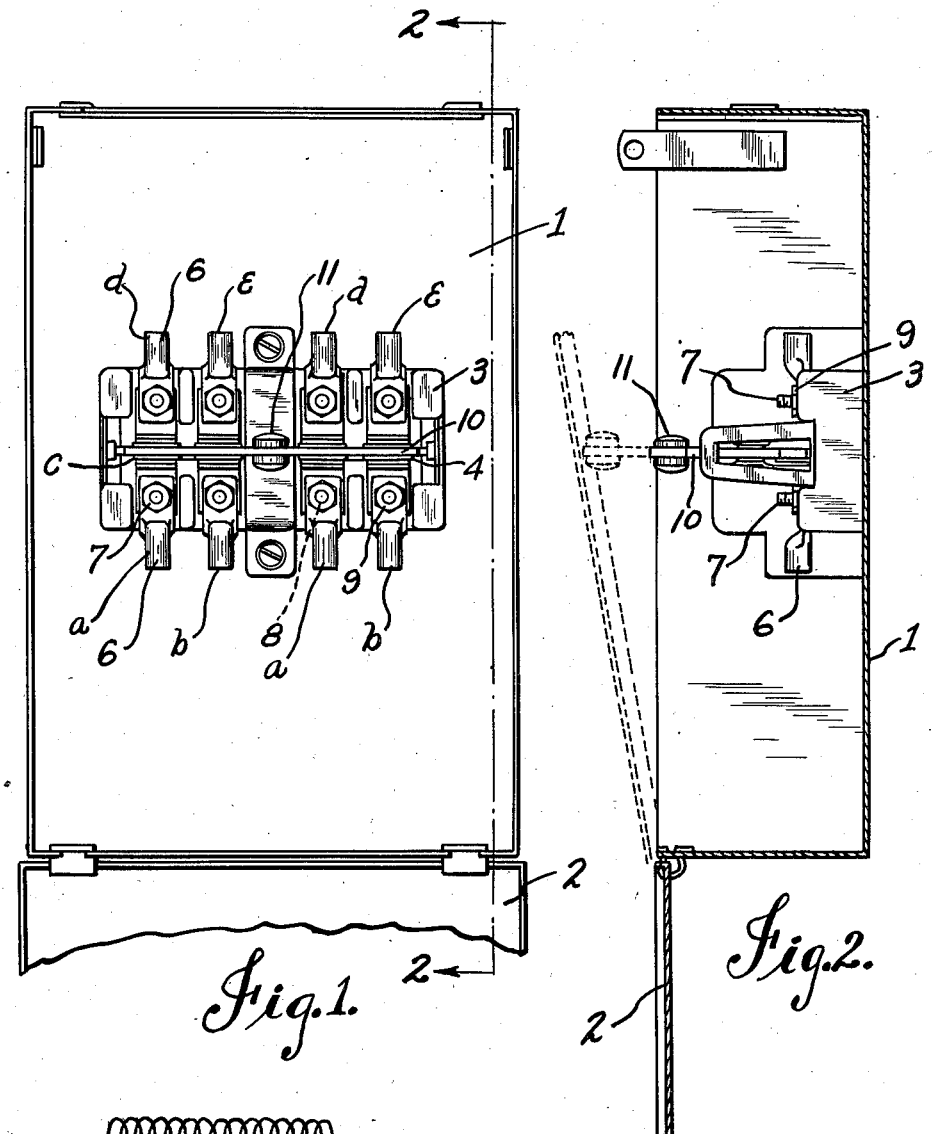
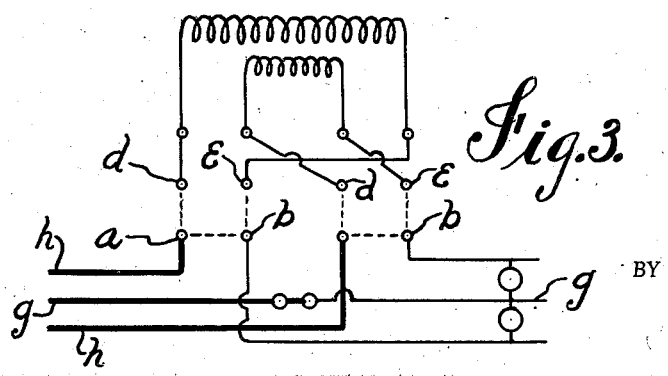
INVENTOR.
George E. Wadsworth
BY
ATTORNEYS Nov. 12, 1935.   G. E. WADSWORTH   2,020,486
METER TEST SWITCH
Filed Aug. 1, 1931   2 Sheets-Sheet 2

INVENTOR.
George E. Wadsworth
BY
ATTORNEYS

Patented Nov. 12, 1935

2,020,486

UNITED STATES PATENT OFFICE 2,020,486

METER TEST SWITCH

George E. Wadsworth, Erlanger, Ky., assignor to The George B. Wadsworth Company, Cincinnati, Ohio, a corporation of Ohio Application August 1, 1931, Serial No. 554,581

7 Claims. (Cl. 175—183)

My invention relates to meter test switches to enable meter testers to quickly make connections to make the various necessary tests on electric service meters, by shunting the meter out without interruption of the supply of current to the load.

It is an object of my invention to provide a testing block which has a positive switch for cutting out the meter lines, which at the same time reestablishes the circuit to the load lines so that a meter tester does not need to curtail the flow of current to the customer's electrical devices.

Another object of my invention is to mount a switch in a cabinet with the switch handle extending to such depth in the cabinet that the cover of the cabinet cannot be closed until the switch is in normal position with the current passing through the meter.

It is another object of my invention to provide a test switch in which the parts are of uniform construction so that a surprisingly few different kinds of parts are required in its assembly, and so that the amount of space required is minimized.

In the testing blocks now in use, terminals must be uncoupled and links used to reopen the circuit to the load; but in my new arrangement, the uncoupling of terminals and the use of links to reopen the circuit is unnecessary and is automatically taken care of by my switch construction.

A still further object is the provision of a meter test switch having a switch-actuating panel which may be removed from the contacts, leaving both the meter and load lines dead.

Another object of my invention is the provision of a meter test switch in which the regular connections to the meter and to the load lines remain closed until the extreme limit of movement of the actuating panel in its outward withdrawal is reached, so that slight variations in the position of the actuating panel will not effect regular passage of current to the meter and load line.

A still further object of my invention is the provision of a meter test switch in which the contact members are loosely mounted so that regardless of slight distortion of the contact elements, there will be no loss of current due to improper electrical connections.

Another object of my invention is the provision of a test switch which can be readily mounted within a cabinet, and to which the line, meter and load connections can be quickly and simply made.

If, in meter testing, the tester does not positively tighten the terminal connections and remove all the links between the terminals, the customer may receive free current until this is discovered; and it is my object to provide a testing switch in which the possibility of such difficulties is entirely avoided. It is further my object to reduce the time required in testing meters.

The above objects and other objects to which I will refer in the ensuing disclosure, I accomplish by that certain combination and arrangement of parts of which I have shown a preferred embodiment.

Referring to the drawings:—

Figure 1 is a plan view of a meter test switch within a cabinet.

Figure 2 is a side elevation of the assembly shown in Figure 1.

Figure 3 is a diagram of one suitable arrangement of a three-wire circuit showing a normal manner of connecting up my novel meter test switch.

Figure 4:
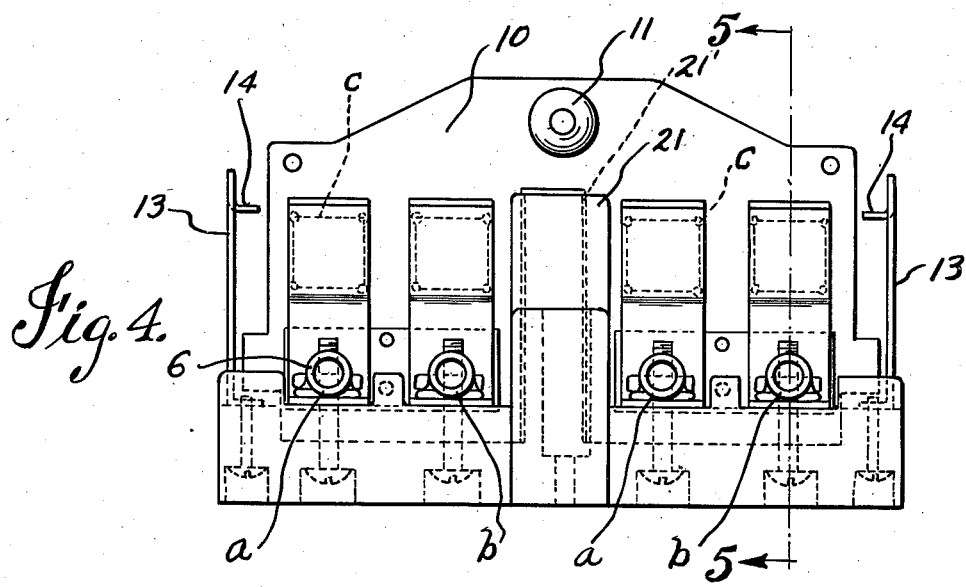
Figure 4 is an end elevation of my preferred switch combination.
Figures 5, 6:
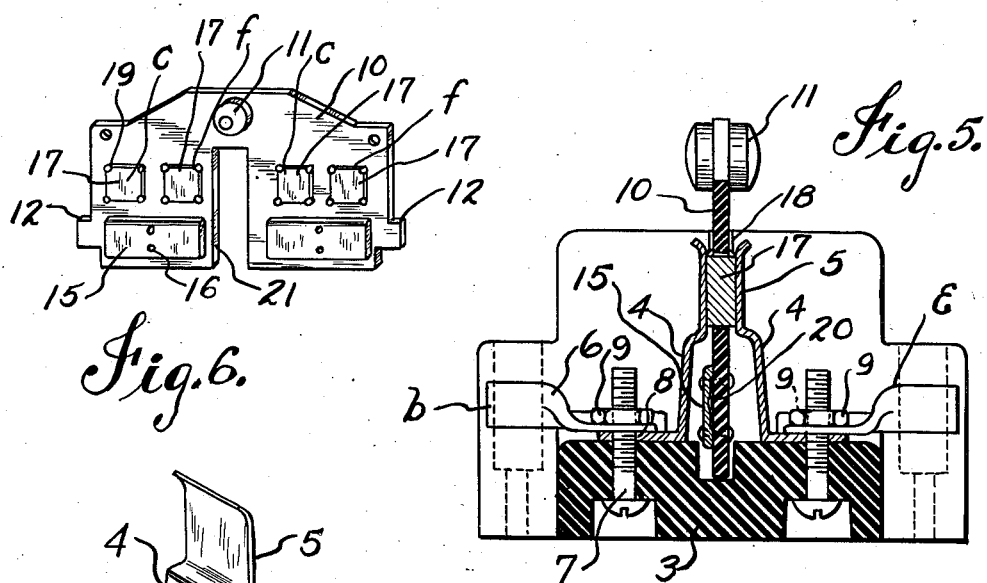
Figure 5 is a sectional view taken along the line 5—5 in Figure 4.
Figure 6 is a perspective view of the switch actuating panel.
Figure 7:
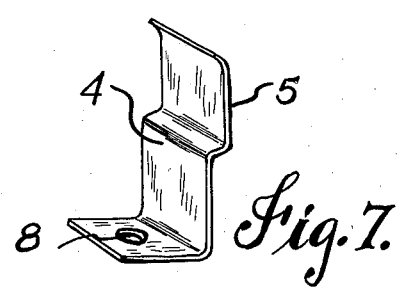
Figure 7 is a perspective view of one of the contact clips.

Referring in detail to the meter testing switch illustrated in Figure 1, I have shown a cabinet having a body 1, and a cover member 2.

My new meter test switch has a mounting block 3 of insulative material, which may be screwed or bolted to the inner wall of the cabinet in any desired manner. Spring switch plates 4 have flattened contact surfaces 5 in which the switch actuating panel is received. Terminal lugs 6, within which wires leading to and from the test switch are soldered, are secured to the mounting panel by screws 7, which pass through openings 8 in the terminal lugs, and which screws carry the nuts 9. The actuating panel is formed from a plate 10 of dielectric material, such as fiber or other composition, and secured within the panel there is an actuating knob 11. The sides of the panel 10 have shoulders 12 which prevent the panel from being removed from its mounting accidentally.

Mounted in the block there are side guide members 13 having stops 14 at their upper ends which abut against the shoulders 12 of the actuating panel when it is pulled out. Since the guides 13 are of resilient construction, they may be pressed apart, thereby releasing the actuating panel so that it may be entirely removed from the assembly, thereby leaving connections both to the meter and to the service lines disconnected.

On the inlet side of the test switch I have shown straps 15 which are riveted as at 16, or otherwise secured to the mounting panel. These straps, with the withdrawal of the actuating panel, shunt the circuit so that current passes from the supply lines direct to the load lines without passing through the meter.

Thus, referring to Figures 1 and 4, the inlet terminals of the switch are indicated at $a$, and the terminals which ordinarily supply current from the meter to the load lines, are indicated at $b$. When the actuating panel is pulled out, as indicated in dotted lines in Figure 2, it will be obvious that the straps 15 will connect the terminals $a$ and $b$, and at the same time the connection ordinarily established by means of the clips 4 and the contact plates 17 will be disconnected.

The contact plates 17 are mounted in openings 18 in the panel 10, and in order to avoid the likelihood of improper contacts, due to slight displacement of these contact plates, they are loosely mounted within the panels, being preferably held therein by means of a flattening of their corners, as indicated at 19. In order to compensate for the position of the plates 17, the straps 15 are preferably provided with loose rivets and with a spring 20 which will allow a slight movement to and from the panel, which will avoid the necessity of having the outer surface of the straps 15 register exactly with the outer surface of the plates 17.

Extending up from the mounting panel there is a guiding member 21 having slots 21' therein which the edges of a vertical slot 22 in the actuating panel engage, and which prevent sidewise or endwise movement of the panel. The slot 21 is slightly offset from a vertically medial position, so that if the actuating panel is reversed it will not fit within the slots 21 in the member 20. This insures against a tester carelessly reversing the actuating panel after its removal from the switch assembly. The member 20, in addition to acting as a guide, also provides a dielectric barrier between poles of opposite polarity.

The use of the meter testing switch assembly will be apparent. Ordinarily the actuating panel is pressed in as far as it will go, and unless it is pressed in the cover member 2 cannot be closed, so that there is little likelihood that a tester will leave the cabinet without re-establishing the proper contact connections; and since the cabinet cannot be locked until the cover is closed, a tester cannot, of course, seal the cabinet until the panel is pushed into its extreme limit of inward movement.

With the panel in, current passes from the terminals $a$ through the contact plates indicated at $c$. Terminals $d$ are connected with the meter, and the return lines from the meter are connected to the terminals $e$. The current passes through the contact plates $f$ to the terminals $b$ which are connected to the load lines.

When the actuating panel is pulled out the current passes, as has been described, directly through the plates 15 from the inlet side of the switch to the outlet side without passing to the meter. The meter being disconnected with the withdrawal of the panel, a tester can quickly make the required tests on the meter.

The wiring diagram in Figure 3 shows a normal arrangement of wires from a three-wire circuit in which the potential lines are indicated at $h$ and the neutral or ground connection at $g$.

The construction of the meter test switch assembly is such that with the withdrawal of the actuating panel, or with its insertion, contact is made with either the meter and load members $c$ and $f$ before contact is broken through the plates 15, or through the plates 15 before the circuit is broken through the contact plates $c$ and $f$.

Having thus described my invention, what I claim as new and desire to secure by Letters Patent, is:—

1. A meter test switch having a mounting panel, terminal connections, certain of which permanently connect to the meter, and spring clips to which said terminals are connected, a slidable panel which remains as part of the switch, having contact plates arranged in a plane extending across said panel for engaging said spring clips and thereby connecting the line supply with the meter and the meter with the load, and other contact members, which also remain part of the switch, arranged in spaced position from said first noted contact members and in the plane of the panel engaging said spring clips and thereby connecting the supply direct with the load, the spacing of said contact members being such that the circuit is not broken in intermediate position of said panel.

2. A meter test switch having a mounting panel, terminal connections, certain of which permanently connect to the meter, and spring clips to which said terminals are connected, a slidable panel which remains as part of the switch, having contact plates arranged in a plane extending across said panel for engaging said spring clips and thereby connecting the line supply with the meter and the meter with the load, and other contact members, which also remain part of the switch, arranged in spaced position from said first noted contact members and in the plane of the panel engaging said spring clips and thereby connecting the supply direct with the load, and a guide for said panel to prevent sidewise or endwise movement thereof, the spacing of said contact members being such that the circuit is not broken in intermediate position of said panel.

3. A meter test switch having a mounting panel, terminal connections, certain of which permanently connect to the meter, and spring clips to which said terminals are connected, a slidable panel which remains as part of the switch having contact plates arranged in a plane extending across said panel for engaging said spring clips and thereby connecting the line supply with the meter and the meter with the load, and other contact members arranged in spaced position from said first noted contact members and in the plane of the panel engaging said spring clips and thereby connecting the supply direct with the load, and guides for said panel having blocking means to limit withdrawal of the panel but movable to permit withdrawal of said panel from said switch assembly, the spacing of said contact members being such that the circuit is not broken in intermediate position of said panel.

4. A meter test switch having a mounting panel, terminal connections, certain of which permanently connect to the meter, and spring clips to which said terminals are connected, a slidable panel which remains as part of the switch having contact plates arranged in a plane extending across said panel for engaging said spring clips and thereby connecting the line supply with the meter and the meter with the load, and other contact members arranged in spaced position from said first noted contact members and in the plane of the panel engaging said spring clips and thereby connecting the supply direct with the load, and guides for said panel having blocking means to limit withdrawal of the panel but movable to permit withdrawal of said panel from said switch assembly, said end guides being resiliently mounted and movable to permit withdrawal of said panel from said switch assembly, the spacing of said contact members being such that the circuit is not broken in intermediate position of said panel.

5. A meter test switch having a mounting panel, terminal connections, certain of which permanently connect to the meter, and spring clips to which said terminals are connected, a slidable panel which remains as part of the switch having contact plates arranged in a plane extending across said panel for engaging said spring clips and thereby connecting the line supply with the meter and the meter with the load, and other contact members arranged in spaced position from said first noted contact members and in the plane of the panel engaging said spring clips and thereby connecting the supply direct with the load, and guides for said panel having blocking means to limit withdrawal of the panel but movable to permit withdrawal of said panel from said switch assembly, said contact members being loosely mounted in said panel, the spacing of said contact members being such that the circuit is not broken in intermediate position of said panel.

6. A meter test switch comprising opposed contact members, two of which connect to the load line and two of which connect to the supply line, on one side, and four of which connect to a meter on the opposite side, and a panel having contact members which connect the load line to the supply line when the panel is in one position, said panel being slidable to another position and having other contact members which connect the meter to the load line when the panel is in said other position, and a casing enclosing the contact members and the panel, having a closure member which is prevented from closing when the panel is in the second mentioned position, but which is allowed to close when the panel is in the first mentioned position.

7. In a meter test switch comprising meter connections and load line and supply connections, and a panel having a series of connectors and adapted to be slid to connect the meter with the load line and supply connections by means of its connectors or to connect the meter with the load line only, without interrupting the connection of the supply and load lines, a casing surrounding the connections and the panel, comprising a cover opened for access to said panel for sliding it, said panel, when slid to cause its connectors to connect the meter with the load line only, preventing closure of the cover, and allowing closure of the cover when slid to connect the load and supply lines.

GEORGE E. WADSWORTH.